United States Patent [19]

Tanaka et al.

[11] Patent Number: 5,759,671
[45] Date of Patent: Jun. 2, 1998

[54] ULTRAVIOLET LUMINESCENT RETROREFLECTIVE SHEETING

[75] Inventors: Osamu Tanaka; Kiyohito Hiromitsu; Hidenori Fushimi, all of Sano, Japan

[73] Assignee: Nippon Carbide Kogyo Kabushiki Kaisha, Tokyo, Japan

[21] Appl. No.: 693,292

[22] PCT Filed: Dec. 15, 1995

[86] PCT No.: PCT/JP95/02572

§ 371 Date: Aug. 15, 1996

§ 102(e) Date: Aug. 15, 1996

[87] PCT Pub. No.: WO96/18920

PCT Pub. Date: Jun. 20, 1996

[30] Foreign Application Priority Data

Dec. 16, 1994 [JP] Japan .................... 6-333593

[51] Int. Cl.⁶ .................... G02B 5/122; G02B 5/128
[52] U.S. Cl. .................... 428/166; 428/141; 428/143; 428/156; 428/195; 428/201; 428/203; 428/204; 428/207; 428/325; 428/913; 428/178; 359/530; 359/531; 359/532; 359/533; 359/534; 359/536; 40/612; 40/442; 40/542; 40/543; 40/582; 250/461.1; 250/486.1
[58] Field of Search .................... 428/141, 143, 428/156, 195, 201, 203, 204, 207, 325, 913, 166, 178; 359/529, 530, 531, 532, 533, 534, 536; 40/612, 442, 542, 543, 582; 250/461.1, 486.1

[56] References Cited

U.S. PATENT DOCUMENTS

| | | | |
|---|---|---|---|
| 3,830,682 | 8/1974 | Rowland | 161/2 |
| 4,025,674 | 5/1977 | Mizuochi | 428/29 |
| 4,250,646 | 2/1981 | Trachtenberg | 40/582 |
| 4,424,449 | 1/1984 | O'Brill | 250/461.1 |
| 4,555,161 | 11/1985 | Rowland | 350/103 |
| 4,653,864 | 3/1987 | Miyata | 350/105 |
| 4,656,072 | 4/1987 | Coburn, Jr. et al. | 428/40 |
| 4,952,023 | 8/1990 | Bradshaw et al. | 350/102 |
| 5,009,019 | 4/1991 | Erlendsson et al. | 40/541 |
| 5,050,327 | 9/1991 | Woltman | 40/582 |
| 5,085,918 | 2/1992 | Rajan et al. | 428/195 |
| 5,223,977 | 6/1993 | Bennett | 359/530 |
| 5,229,882 | 7/1993 | Rowland | 359/530 |
| 5,237,448 | 8/1993 | Spencer et al. | 119/792 |
| 5,272,562 | 12/1993 | Coderre | 359/529 |
| 5,414,947 | 5/1995 | Hjaltason | 40/615 |
| 5,478,628 | 12/1995 | Billingsley et al. | 428/171 |
| 5,516,227 | 5/1996 | Kozak et al. | 404/9 |

FOREIGN PATENT DOCUMENTS

| | | |
|---|---|---|
| 50-47591 | 4/1975 | Japan . |
| 51-144198 | 12/1976 | Japan . |
| 57-133004 | 8/1982 | Japan . |
| 60-194405 | 10/1985 | Japan . |
| 5173008 | 7/1993 | Japan . |
| 643819 | 2/1994 | Japan . |
| 6250006 | 9/1994 | Japan . |
| 9314422 | 7/1993 | WIPO . |

*Primary Examiner*—William Watkins
*Attorney, Agent, or Firm*—Sherman and Shalloway

[57] ABSTRACT

Ultraviolet luminescent retroreflective sheeting includes a retroreflective portion containing retroreflective elements and an ultraviolet luminescent portion to facilitate nighttime viewing by persons not located at or near a source of light being retroreflected by the retroreflective portion. At least part of the ultraviolet luminescent portion is provided as the bonding lines for bonding the transparent cover sheet to the support sheet to form a series of sealed cells in which the retroreflective elements, which may be of the encapsulated lens-type or the encapsulated cube-corner-type, are disposed. The ultraviolet luminescenct portion includes fluorescent agent which emits light when irradiation by ultraviolet irradiation. The ultraviolet luminescent retroreflective sheeting may be used in a display device, such as a roadside sign, in combination with a source of ultraviolet radiation means which may be formed integrally with the sheeting or spaced therefrom and which will, in operation, emit ultraviolet rays in the direction of the retroreflective sheeting.

24 Claims, 4 Drawing Sheets

ULTRAVIOLET LUMINESCENT RETROREFLECTIVE SHEETING

TECHNICAL FIELD

This invention relates to a retroreflective sheeting which is useful for markings such as road signs, directional signs and construction signs; number plates on vehicles such as automobiles and motorcycles; safety goods such as safety cloths and survival equipment; and marking materials for signboards, vehicles, etc. More particularly, the invention relates to an ultraviolet luminescent retroreflective sheeting composed of a retroreflective region in which retroreflective elements are disposed and an ultraviolet luminescent region which emits light under ultraviolet radiation, said ultraviolet luminescent region containing a fluorescent agent which emits light under ultraviolet radiation and a resin component, and the luminance of said light being within a specific range.

Background Technology

Retroreflective sheetings which retroreflex light towards the light source are well known. Utilizing their excellent visibility at night due to the retroreflective property, the sheetings have been used in wide areas as above. For example, road signs, construction signs or the like using a retroreflective sheeting reflex light from a light source such as headlight of a running vehicle like automobile in the direction of the light source at night, i.e., in the direction of the running automobile, to provide excellent visibility to the driver of the vehicle who sees the sign. Thus the sheeting exhibits a very favorable property of whereby enabling transmission of accurate informations.

Whereas, since retroreflective sheetings in general reflex-reflect light from a light source toward the light source, they offer excellent visibility in the direction of the light source, but only markedly inferior visibility to the persons who are not in the direction of the light source. Furthermore, because of the property innate in retroreflective sheeting, as a light source on a vehicle like an automobile approaches a retroreflective sheeting-made sign, the divergence between the angle of incident light from the light source and that of the driver's observation increases, to substantially reduce the visibility. Besides, accompanying recent road system development and diversification in informations to be transmitted, amount of informations loaded on single directional sign is increasing, and when speed of a running vehicle is taken into consideration, it has become very difficult for a driver to read the necessary informations within an extremely short time during which he stays in the area wherefrom the retroreflective light is visible.

For those reasons, conventional type retroreflective sheetings having the retroreflective ability alone provide only insufficient visibility when they are put to the usages where more accurate information supply or higher advertising effect are required. In particular, high quality retroreflective sheeting, which is capable of offering always excellent visibility, even at night, for example, and even to persons who are located in the directions differing from that of the light source, has been strongly demanded.

Aiming at meeting this demand, various attempts have been made to improve visibility of retroreflective sheeting. For instance, JP-A-173008/1993 discloses an encapsulated lens-type retroreflective sheeting exhibiting, concurrently with retroreflectivity, long persistent phosphorescence, in which a transparent resin layer is used as a support layer and a layer of long persistent phosphorescent substance is provided on the back of the support layer (the surface opposite to the incident side). However, the luminous energy of the luminescent substance is low and besides, visibility-improving effect of this proposal is yet definitely insufficient, because according to the proposal the layer of long persistent phosphorescent substance is under that of the microspherical lens layer and, of the light emitted by the substance, mainly only the part which transmitted the spaces between the microspherical lenses is visible.

PCT International Publication WO 93/14422 discloses a photoluminescent encapsulated cube-corner type retroreflective sheeting in which the bonding portion connecting the surface on the cube-corner-forming side and the support layer contains phosphorescent pigment. The international publication also suggests a method for imparting photoluminescence to sealed lens-type retroreflective sheeting and encapsulated lens-type retroreflective sheeting. In this second proposal also, however, the luminous energy emitted from the phosphorescent pigment is not high, similar to that of the long persistent phosphorescent substance employed in the first proposal, and cannot provide high visibility allowing perception of information contained therein, when the sheeting is used for signs, from places apart from the signs at a substantial distance.

Furthermore, for example JP-A-43819/1994 proposes to improve visibility by combining fluorescent coloring agent with retroreflective sheeting, but conventional fluorescent coloring agents generally exhibit poor weatherability and are inadequate for usages requiring long-term weatherability, such as for road signs. Again, the luminescent intensity is yet insufficient, and the visibility-improving effect achievable with the proposal is not satisfactory.

For improving visibility in general, internally lighted signboards, electric signboards, externally lighted signboards or the like are used, but for signs of elevated set up like road signs or directional signs, internally lighted or electric signboards are difficult of maintenance. There is still another drawback that signs of these systems are large scaled and expensive. In addition, internally lighted signboards have been subject to the problems that borderlines between different colors are blurred or characters are defaced, rendering it difficult to accurately express the content to be conveyed.

Also in electric signboards, the light-emitting elements are large and independent of each other. In consequence, unevenness in the luminescent plane is apt to occur due to differences in life span of said elements. Besides, they are subject to a problem because they adopt line- or dot-luminescent system, that they cannot precisely express the characters or designs to be displayed. Externally lighted signboards have an advantage that they exhibit excellent visibility to persons who are in the directions other than that of the light source as well, but on the other hand have such inconveniences when they are used as traffic directional signs containing a large volume of informations that car drivers have difficulties in perceiving their contents from distant places due to insufficient luminous energy or the like and hence the drivers are required to instantaneously comprehend the whole contents as they sufficiently approach the signs.

We have conducted various investigations on visibility of retroreflective sheeting and discovered: a superb retroreflective sheeting exhibiting excellent visibility to not only those who are in the light source direction but also those who are in the directions other than the light source direction is obtained by forming an ultraviolet (UV) luminescent region on a part of a retroreflective sheeting, with a UV luminescent resin composition comprising a fluorescent agent which emits light under UV rays (which may be hereafter referred to briefly as "UV fluorescent agent") and a resin component; and when said retroreflective sheeting is used in combination with a UV radiation means which radiates UV in the direction of said retroreflective sheeting as used in, for example, display devices such as road signs or directional signs, drivers of vehicles like automobiles can recognize contents of the signs by the reflex-reflection when they are distant from the display devices, and by the UV luminescence as they approach the devices. The present invention is thus completed.

Disclosures of the Invention

Thus, according to the present invention an ultraviolet luminescent retroreflective sheeting composed of a retroreflective region in which retroreflective elements are disposed and an ultraviolet luminescent region which emits light under ultraviolet radiation is provided, said sheeting being characterized in that said ultraviolet luminescent region contains a fluorescent agent which emits light under ultraviolet rays and a resin component, and the luminance of the ultraviolet luminescent region, when irradiated with a fluorescent lamp which emits near-ultraviolet rays of main wavelength around 360 nm at a light-receiving intensity of 0.8 mW/cm$^2$, is at least 10 cd/m$^2$.

Again, according to the present invention as above, a display device which comprises, in combination, an ultraviolet luminescent retroreflective sheeting and a means for radiating ultraviolet rays in the direction of said retroreflective sheeting, is provided.

Hereafter the ultraviolet luminescent retroreflective sheeting of the present invention shall be explained in further details, referring to FIGS. 1–8.

In a UV luminescent retroreflective sheeting of the present invention, the retroreflective element which is a constituent of the retroreflective region is not subject to any critical limitations. The element may be, for example, a lens-type retroreflective element formed of microspherical lenses such as glass beads and a photo-reflective metallized layer, cube-corner type retroreflective element wherein each pair of confronting planes face with each other at an angle of approximately 90°, or the like.

Again the construction of the retroreflective region is subject to no specific limitation. For example, it may be exposed lens-type, encapsulated lens-type, sealed lens-type, encapsulated cube corner-type or metal vapor-coated cube corner-type retroreflective structure.

An exposed lens-type retroreflective structure comprises a support layer and many microspherical lenses which are disposed forming substantially in a monolayer and are embedded in the incident side surface of said support layer to about their hemispheres which are covered with a photo-reflective metallized layer.

Figure 2:
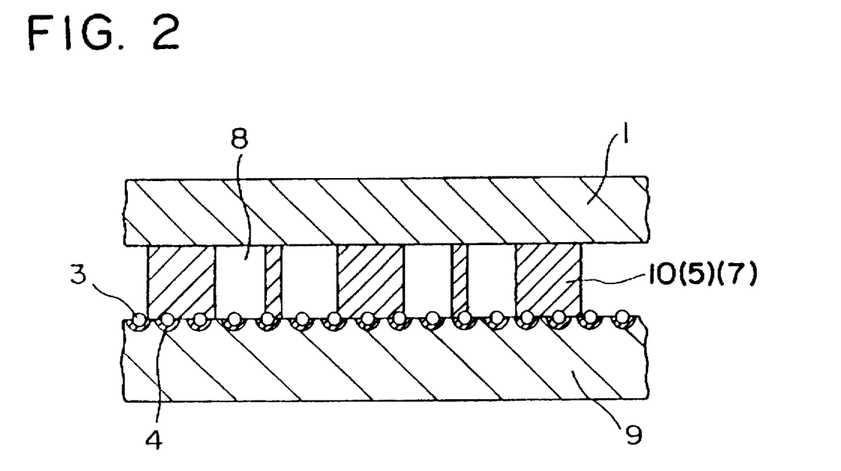
FIG. 2 is a schematic cross-sectional view of the retroreflective sheeting of FIG. 1, cut along A—A in FIG. 1.
Figure 4:
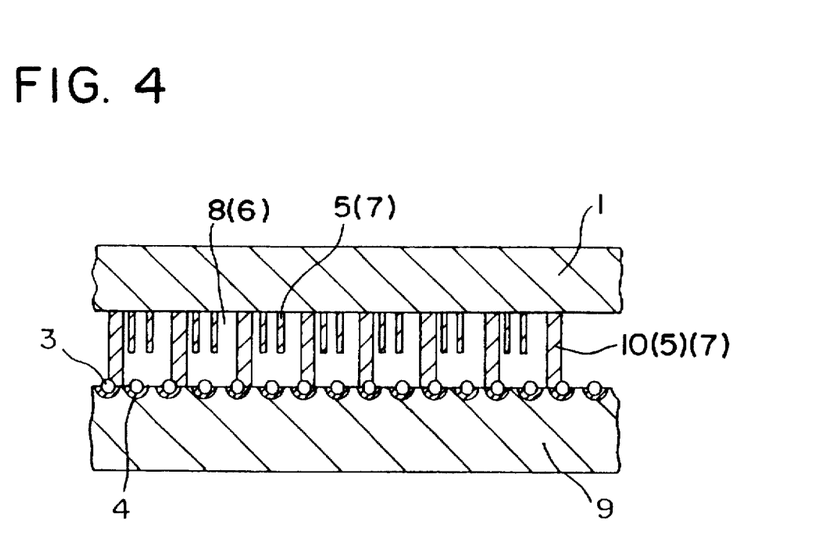
FIG. 4 is a schematic cross-sectional view cut along B—B in FIG. 3.

An encapsulated lens-type retroreflective structure is illustrated, for example, by the schematic cross-sectioned views of FIGS. 2 and 4, in which the retroreflective region is composed of a light-transmitting cover layer; support layer; a layer of lens-type retroreflective elements which are many microspherical lenses disposed on the surface facing the light-transmitting cover layer of the support layer as substantially a monolayer, and supported by the support layer as they are embedded in said layer to their hemispheres, said embedded hemispheres being covered with photo-reflective metallized membrane; and an air layer between the light-transmitting cover layer and the layer of lens-type retroreflective elements, said air layer being formed as the light-transmitting cover layer and the support layer are partially connected by bonds while leaving spaces between said two layers at the parts where said two layers are not connected by bonds, and said bonds dividing said air layer into a large number of hermetically sealed small compartment cells.

Figure 5:
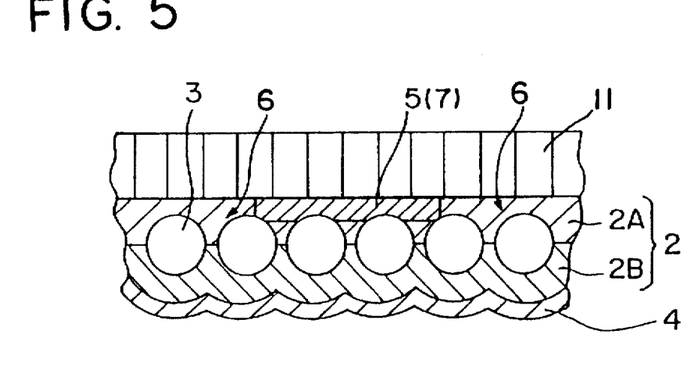
FIG. 5 is a schematic cross-sectional view illustrating an example of UV luminescent retroreflective sheeting of the present invention having sealed lens-structured retroreflective region.

Sealed lens-type retroreflective structure can be illustrated, for example, by the schematic cross-sectional view of FIG. 5, in which the retroreflective region is composed of a light-transmitting support layer; a layer of microspherical lenses which are disposed forming substantially a monolayer on the surface of the light-transmitting support layer opposite to its incident side surface and are supported by said support layer as embedded therein to about their hemispheres; a light-transmitting focusing layer formed approximately along the surfaces of their hemispheres unembedded in the support layer of the microspherical lenses and having such a thickness that places the substantial foci for the microspherical lenses on the surface of the side not coming into contact with said lenses; and a photoreflective metallized membrane which is formed on the surface of the focusing layer not coming into contact with the microspherical lenses. Also as shown in FIG. 5, if necessary an additional light-transmitting surface-protective layer may be laminated on the incident surface of the support layer.

Figure 6:
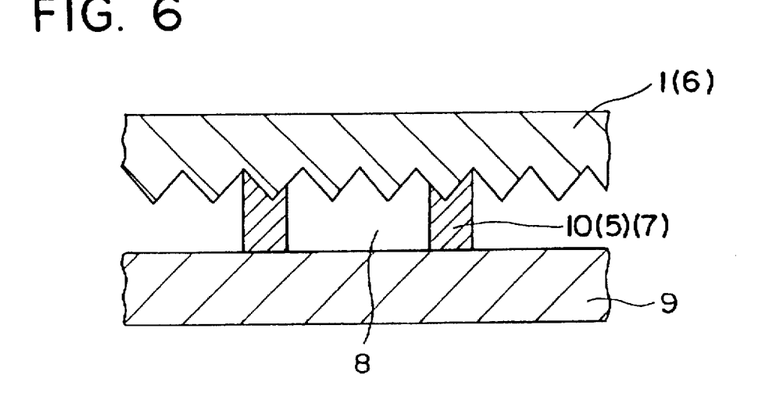
FIG. 6 shows an example of UV luminescent retroreflective sheeting of the present invention having encapsulated cube corner-structured retroreflective region.
Figure 7:
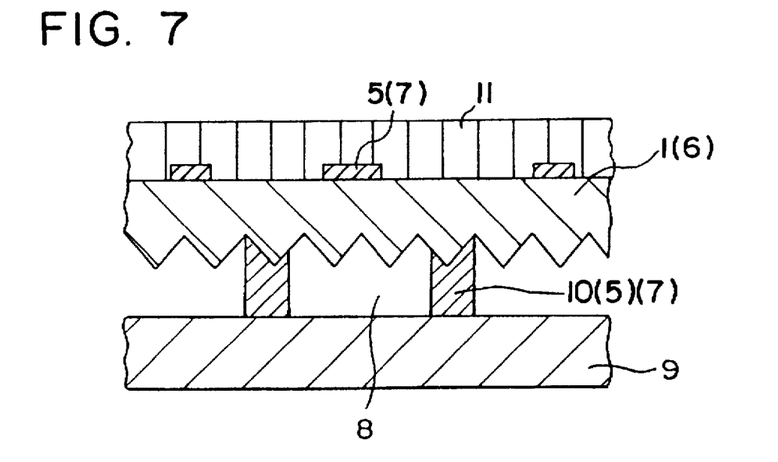
FIG. 7 shows another example of UV luminescent retroreflective sheeting of the present invention having encapsulated cube corner-structured retroreflective region, which is an embodiment different from that of FIG. 6.

Examples of encapsulated cube-corner type retroreflective structure are illustrated by the schematic cross-sectional views of FIGS. 6 and 7, which are composed of a light-transmitting cover layer; a layer of cube-corner type retroreflective elements which is disposed on the back of said cover layer; a support layer; and an air layer between said cube-corner type retroreflective element layer and the support layer; said air layer being formed as the cube-corner type retroreflective element layer and the support layer are partially connected by bonds while leaving spaces between said two layers at the parts where said two layers are not connected by bonds, and said bonds dividing the air layer into a large number of hermetically sealed small compartment cells. Also as shown in FIG. 7, if necessary an additional light-transmitting surface-protective layer may be laminated on the incident surface of the light-transmitting cover layer.

A metal vapor-coated cube-corner type retroreflective structure refers to one which comprises at least a light-transmitting cover layer; a layer of cube-corner type retroreflective elements which is disposed on the back of said cover layer; and a photo-reflective metallized membrane which is formed on the entire surface of the cube-corner type retroreflective elements. Again if necessary an additional light-transmitting surface-protective layer may be laminated on the incident surface of the light-transmitting cover layer.

The support layer to be used in the UV luminescent retroreflective sheeting of the present invention may be formed of same resins which are useful as the resin component of UV luminescent resin compositions, e.g., acrylic resins, urethane resins, polyester resins, vinyl chloride resins, vinyl acetate resins, polyolefin resins, fluorine-containing resins, polyamide resins, etc., which can be used either singly or in copolymerized form with other(s) of such resins, or in blended form.

Said support layer may be crosslinked by the action of a crosslinking agent such as of isocyanate-, melamine- or metal-type, and if necessary may contain various fillers such as cellulose derivatives, multistage polymerization type internal crosslinked resins, coloring agents, UV fluorescent agent, light storing color developers, heat stabilizers, ultraviolet absorbers, etc. Preferred thickness of the support layer normally ranges approximately 20–200 µm.

For lens-type retroreflective structure, the support layer is not necessarily composed of a single layer, but may be composed of a binder layer supporting the glass beads as embedded therein and a reinforcing layer which is laminated on the surface of the binder layer opposite to the glass beads-embedded side. The thickness of the reinforcing layer is conveniently designed normally to be within a range of 10–100 µm, in particular, 30–80 µm. The support layer may further include an intermediate layer between the binder layer and the reinforcing layer, for increasing adhesive power of said two layers.

A light-transmitting cover layer useful for the UV luminescent retroreflective sheeting of the present invention and a light-transmitting surface-protective layer optionally laminated if necessary have a total light transmittance of at least 20%, preferably at least 40%, and exhibit a reasonable extent of pliability. Otherwise, they are not particularly limited as to their material which may be, for example, acrylic resin film, fluorine-containing resin film, polyurethane resin film, vinyl chloride resin film, polycarbonate resin film, polyester resin film, polyolefin resin film or the like.

It is normally preferred that these cover layer and surface-protective layer are unstretched, because monoaxially or multi-axially stretched film is apt to be subject to residual strain which impairs durability of the produced retroreflective sheeting, while the stretching increases mechanical strength of the film. The thickness of the cover layer is variable over a wide range depending on the intended use of the retroreflective sheeting as the final product, while it normally ranges 20–200 µm, preferably 40–150 µm, inter alia, 50–100 µm. The thickness of the surface-protective layer is normally set to be 10–200 µm, preferably 20–150 µm, inter alia, 30–100 µm.

Retroreflective sheetings having above-described various retroreflective structures and their production processes are described in a number of publications: for example, exposed-lens type retroreflective sheeting is disclosed in U.S. Pat. No. 2,326,634, JP-A-189839/1982; encapsulated lens-type retroreflective sheeting, for example, in JP-A-194405/1985 (corres. to U.S. Pat. No. 4,653,854); sealed lens-type retroreflective sheeting, for example, in JP-B-2921/1981 (corres. to U.S. Pat. No. 4,025,674); encapsulated cube-corner type retroreflective sheeting, for example, in U.S. Pat. No. 3,417,959; and vapor coated metal cube-corner type retroreflective sheeting, for example, in JP-A-106839/1974 (corres. to U.S. Pat. No. 3,712,706), etc. These references are cited here instead of describing those products and processes more specifically.

The UV luminescent retroreflective sheeting of the present invention has the prominent characteristic feature in that it contains, concurrently with the above-described retroreflective region, a UV luminescent region emitting light under UV radiation. The retroreflective region has retroreflectability, and functions to reflex-reflect light from a light source toward the light source direction to offer excellent visibility to those who are in said direction. Whereas, the UV luminescent region emits light, under UV radiation from a UV radiating means such as a UV lamp or the like, to diverse directions so as to provide excellent visibility to those who are in the locations not in the direction of the light source as well.

In a UV luminescent retroreflective sheeting of the present invention, said UV luminescent region preferably contains a resin component concurrently with a fluorescent agent which emits light under UV rays. When said region is irradiated with near-ultraviolet rays of the main wavelength around 360 nm from a fluorescent lamp at a light receiving intensity of 0.8 mW/cm$^2$, the region is required to have a luminance of at least 10 cd/m$^2$, preferably at least 15 cd/m$^2$, inter alia, at least 20 cd/m$^2$. When the luminance is less than the above lower limit, the region cannot provide sufficient visibility.

The luminance of the light emitted from the UV luminescent region is measured according to the later described method.

The UV luminescent region according to the present invention is formed of a UV luminescent resin composition containing, per 100 parts by weight of the resin component, preferably 10–600 parts by weight, in particular, 50–400 parts by weight, inter alia, 100–300 parts by weight, of a UV fluorescent agent. When the added amount of UV fluorescent agent is at least the above-specified lower limit, satisfactory luminescent function and excellent visibility can be obtained. Again, when the amount is not more than the above upper limit, such an inconvenience that the formed UV luminescent region becomes too hard and brittle is avoided and desirable properties such as mechanical strength, pliability, etc. are not impaired. Thus, the range as above specified gives favorable result.

Said UV fluorescent agent signifies any fluorescent agents which emit light under UV radiation. As long as they are capable of forming a UV luminescent region satisfying aforesaid luminance requirement, they are subject to no other particular limitations, but can be optionally selected from various fluorescent agents, e.g., organic fluorescent agents which generally exhibit relatively high photo-transmittance such as naphthotriazoles and benzoxazoles; and generally non-photo-transmitting inorganic fluorescent agents such as inorganic metal salts, halides and sulfides, etc.

Examples of the organic fluorescent agents include, besides diaminostylbenzene, uranine, thioflavine T, eosine, Rhodamine B and Acridine Orange, organic pigments derived from diphenylmethane, triphenylmethane, xanthene, thiazine and thiazole dyes. These can be used either singly or as mixtures of more than one materials.

Examples of the inorganic fluorescent agent include green light-emitting inorganic fluorescent agents such as $Zn_2GeO_4$:Mn, ZnO:Zn, ZnS:Cu, ZnS:(Cu,Al), (Zn,Cd)S:(Cu,Al), ZnS:(Cu,Au,Al), $Zn_2SiO_4$:Mn, ZnS:(Cu,Ag), (Zn,Cd)S:Cu, $Gd_2O_2S$:Tb, $La_2O_2S$:Tb, $Y_2SiO_5$:(Ce,Tb), $CeMgAl_{11}O_{19}$:Tb, ZnS:(Cu,Co), LaOBr:(Tb,Tm), $La_2O_2S$:Tb, $BaMg_2Al_{16}O_{27}$:(Eu,Mu), etc.; red light-emitting fluorescent agents such as; $Y_2O_3$:Eu, $Y(P,V)O_4$:Eu, $Y_2O_2S$:Eu $0.5MgF_2.3.5MgO.GeO_2$:Mn, $YVO_4$:Eu, $(Y,Gd)BO_3$:Eu, etc.; blue light-emitting fluorescent agents such as; $Sr_5(PO_4)_3Cl$:Eu, $BaMg_2Al_{16}O_{27}$:Eu, $BaMgAl_{10}O_{17}$:Eu, ZnS:Ag, $CaWO_4$, $Y_2SiO_5$:Ce, ZnS:(Ag,Ga,Cl), $Sr_2P_2O_7$:Eu, CaS:Bi, CaSrS:Bi, etc. They can be used either singly or as mixtures. It is also permissible to use these inorganic fluorescent agents in combination with above organic fluorescent agents.

Inorganic fluorescent agents generally excel over organic fluorescent agents in photostability, heat stability, solvent resistance, etc. and use of those inorganic agents is preferred depending on the environments in which the UV luminescent retroreflective sheeting is to be used. Of those inorganic agents, furthermore, in particular above-named green, red or blue light-emitting inorganic fluorescent agents are preferred, because of the advantage that their UV luminescent luminance is high and gives excellent visibility at night.

Again, of those inorganic fluorescent agents, those having a particle size distribution that at least 80% by weight of the particles have a size 25 μm or less in diameter are preferred. As for those green light-emitting inorganic fluorescent agents, those having a particle size distribution width of 0.1–50 μm and the highest frequency particle size of approximately 12 μm are preferred; for the red light-emitting agents, those having a particle size distribution width of 0.1–8 μm and the highest frequency particle size of approximately 3 μm; and for the blue light-emitting agents, those having a particle size distribution width of 0.1–12 μm and the highest frequency particle size of 8 μm; are conveniently used.

Furthermore, as these inorganic fluorescent agents, generally those which emit light under radiation of UV rays of wavelengths ranging 250–400 nm are preferred.

The resin component to be contained in the UV luminescent resin composition forming the UV luminescent region, concurrently with above-explained UV fluorescent agent, is not subject to any specific limitation as to the kind of the resin, so long as the resin can retain the UV fluorescent agent as dispersed therein. Examples of useful resins include acrylic resins, urethane resins, polyester resins, fluorine-containing resins, vinyl chloride resins, vinyl acetate resins, polyethylene resins, polypropylene resins, polycarbonate resins, etc. which can be used either singly or as copolymerized or blended. Of these, acrylic resins, urethane resins, polyester resins and fluorine-containing resins are preferred because of their good weatherability and processability, acrylic resins being the most convenient.

The UV luminescent resin composition may further contain, besides the resin component and UV fluorescent agent, a coloring agent such as ordinary colorant, long persistent phosphorescent color developer, etc. and other additives such as photostabilizer, heat stabilizer, filler, crosslinking agent, etc., as individual occasion demands.

In the construction of the UV luminescent retroreflective sheeting of the present invention, the manner of disposition of UV luminescent region forming a part of said sheeting is not critical. The region may be formed in each desired location(s) in desired configuration. For example, a retroreflective region and a UV luminescent region may be separately and locally disposed, or either one of the regions may be provided over the entire area and the other region can be disposed thereover or thereunder, either partially or wholly. Furthermore, it is also possible to provide a UV luminescent region at an intermediate layer position of a multilayer-structured retroreflective region such as of aforesaid sealed lens-type retroreflective structure or capsule type retroreflective structure, for example, below the light-transmitting cover layer or light-transmitting surface-protective layer, either partially or wholly.

Whereas, when a non-light-transmitting UV luminescent region is formed or disposed above the retroreflective elements in the retroreflective region, using a UV luminescent resin composition containing a normally non-light-transmitting fluorescent agent such as an inorganic fluorescent agent, it should be avoided to provide the UV luminescent region over the entire retroreflective region, because the retroreflective performance of the retroreflective elements under such a UV luminescent region is impaired. Similarly, when a non-light-transmitting retroreflective region or non-light-transmitting portion of a retroreflective region is disposed above a UV luminescent region, it is necessary to avoid providing the former over the entire UV luminescent region, because the UV luminescent performance of the UV luminescent region underneath is impaired.

When a light-transmitting or semi-light-transmitting UV luminescent region or a retroreflective region is used, it is possible to place either one of the regions over the entire surface of the other. In that case, a UV luminescent retroreflective sheeting is provided in which an identical part has both UV luminescent property and retroreflective property.

In those various embodiments of the UV luminescent retroreflective sheeting of the present invention, when the intended use of the sheeting is for durable display devices such as road signs or directional signs, it is preferred to form the UV luminescent region using a UV luminescent resin composition containing an inorganic fluorescent agent which generally exhibits better photostability, heat stability, solvent resistance, etc. compared with organic fluorescent agent as stated earlier. Whereas, because inorganic fluorescent agents are normally non-light-transmitting, a UV luminescent region containing an inorganic fluorescent agent cannot be provided over the entire upper surface of a retroreflective region and when it is used in combination with a retroreflective region having lens-type retroreflective elements of an exposed, encapsulated or sealed structure, it should be formed partially over such a retroreflective region. It is also possible to form a UV luminescent layer with this type of UV luminescent resin composition on the upper surface of an ordinary support layer and thereafter to embed glass beads therein in a monolayer level, so as to let the spaces between the glass beads serve as a UV luminescent region. Furthermore, these means can be employed in combination.

Of these retroreflective regions, when one having an encapsulated lens-type or sealed lens-type retroreflective structure is to be combined with a UV luminescent region, the luminescent region is preferably formed under the light-transmitting cover layer of the retroreflective structure, for better durability or pollution resistance of the UV luminescent region. In particular, when the retroreflective region has an encapsulated lens-type retroreflective structure, it is preferable to make the bonds partially connecting said cover layer with the support layer holding said lens-type retroreflective elements serve as the UV luminescent region, and if necessary to further provide a UV luminescent layer on a part of the capsule-facing side of the cover layer or to let the spaces between the glass beads also serve as the UV luminescent region as stated earlier, or to combine these means. Again, in combining with a sealed lens-type retroreflective structure, it is preferred to form the UV luminescent region on the incident side surface of the support layer, i.e., the side opposite to the microspherical lenses-embedding surface, and/or on the support layer-facing side of the surface-protective layer which is laminated on the incident side of said support layer, to sandwich the UV luminescent region between the surface-protective layer and the support layer.

Furthermore, when combined with a retroreflective region having an encapsulated cube-corner type structure, preferably the UV luminescent region is formed under the light-transmitting cover layer, and/or, if necessary, under the light-transmitting surface-protective layer which is laminated on the incident side surface of the cover layer, for the same reason as stated above. More specifically, a part or whole of the bonds connecting the light-transmitting cover layer with the support layer can be made the UV luminescent region; or the UV luminescent region may be formed on the incident-side surface of the cover layer, i.e., the surface on which cube corners are not formed, and/or the cover layer-facing side of the surface-protective layer which is laminated on the incident-side surface of the cover layer. Because cube-corner type retroreflective elements are formed on the back of the light-transmitting cover layer and are themselves transparent, the UV luminescent region may be formed on the support layer, over the whole of said layer or part of optionally determined area.

When combined with a retroreflective region of a metal vapor-coated cube-corner type, the UV luminescent region can be formed on the incident-side surface of the cover layer, i.e., the surface on which the cube corners are not formed, and/or the cover layer-facing side of the surface protective layer which is laminated on the incident-side surface of the cover layer.

The means for forming a UV luminescent layer according to the present invention is not critical per se. For example, printing means such as screen print, photogravure using the earlier described UV luminescent resin compositions is preferred, because it allows relatively easy formation of the regions of even complicated pattern. In particular, screen printing is the most convenient, which can form a thick layer by single operation.

Again, in a preferred embodiment of a UV luminescent capsule-type retroreflective sheeting according to the present invention, preferably the bonds partially connecting the cover layer and the support layer are formed on either the cover layer or the support layer using the UV luminescent resin composition, as earlier described, as a UV luminescent layer by said printing means, and then they are melt-bonded to either the support layer or cover layer under heating, or adhered by a suitable adhesive. Furthermore, the support layer may be formed of the UV luminescent resin composition, or a UV luminescent layer may be formed on an ordinary support layer with said resin composition, and such a support layer or a laminate of the support layer and a UV luminescent layer is partially thermofused and formed into the bonds which partially connect the cover layer and support layer, with such means as an embossing roll.

In the UV luminescent retroreflective sheeting of the present invention where its UV luminescent region uses a non-light-transmitting inorganic fluorescent agent, generally the areal ratio of the retroreflective region can be within a range of 10–90%; that of the UV luminescent region, within a range of 10–100%; and the sum of the areal ratios of the two regions is suitably designed to be at least 85%; when the total area of the incident-side surface of the sheeting is set to be 100%. Preferably, the areal ratios of these two regions should be determined depending on the kind of the retroreflective elements used. When the retroreflective region is of lens-type, the areal ratio of the retroreflective region may range 10–70%, in particular, 20–60%, inter alia, 30–50%; that of the UV luminescent region may range 10–90%, in particular, 30–80%, inter alia, 40–70%; and the sum of the areal ratios of the two regions may range 90–120%, in particular, 100%.

When the retroreflective region is of cube-corner type, those areal ratios are preferably designed to make that of the retroreflective region 10–90%, in particular, 15–80%, inter alia, 20–60%; that of the UV luminescent region, 10–100%, in particular, 20–85%, inter alia, 40–80%; and the sum of the areal ratios of the two regions, 90–190%, in particular, 90–120%, inter alia, 100%.

In the above, the area of a retroreflective region refers to the area of the part actually having retroreflective ability. For example, in an encapsulated lens-type retroreflective region, said area corresponds to the value obtained by subtracting, from the total area of the incident-side surface, those of the parts which are closer to said surface than the retroreflective region is, i.e., subtracting the areas whose retroreflectivity is lost, such as the area of non-light-transmitting UV luminescent region which is formed on the light-transmitting cover layer or light-transmitting surface-protective layer or directly on the retroreflective region by means of printing, etc., and those of the bonds which are formed by partial thermofusing and thermoforming of the support layer.

In case of a sealed lens-type retroreflective region, the area is one obtained by subtracting, from the total area of the incident-side surface, those of the parts which are closer to said surface than the retroreflective region is, i.e., subtracting the area of the part whose retroreflectivity is lost, such as the area of non-light-transmitting UV luminescent region formed on the light-transmitting cover layer or light-transmitting surface-protective layer surface, by such means as printing, etc.

When the retroreflective elements are of encapsulated cube-corner type, the retroreflective area is the value obtained by subtracting, from the total area of the incident-side surface, those of the parts closer to said surface than the retroreflective region is, i.e., subtracting the areas of the parts whose retroreflectivity is lost, such as the non-light-transmitting UV luminescent region which is formed on the light-transmitting cover layer or light-transmitting surface-protective layer surface by such means as printing, etc., and the bonds which are formed by printing, etc. or by partial thermofusing and thermoforming of the support layer.

Hereinafter the UV luminescent retroreflective sheeting of the present invention is more specifically explained with reference to the preferred embodiments as illustrated in FIGS. 1–8.

Figure 1:
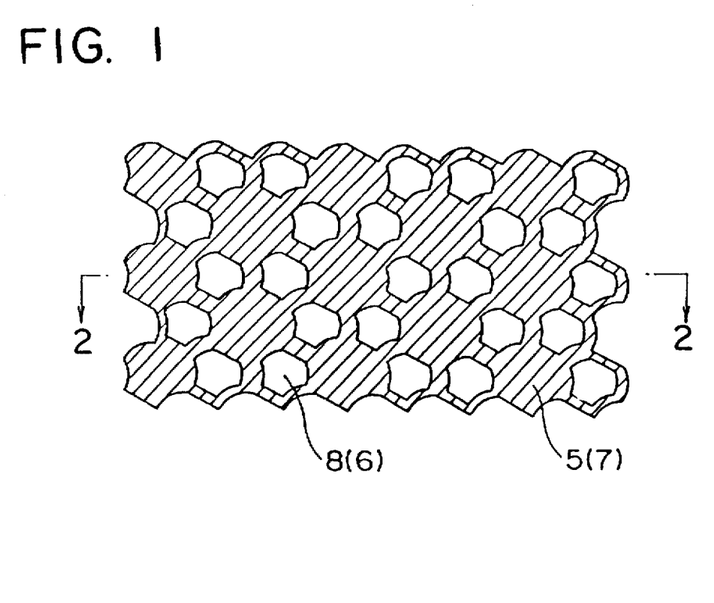
FIG. 1 is an example of schematic plan view of a UV luminescent retroreflective sheeting of the present invention having encapsulated lens-structured retroreflective region, as seen from the incident side.

FIG. 1 is an example of schematic plan view of a UV luminescent retroreflective sheeting of the present invention having encapsulated lens-structured retroreflective region, as seen from the incident side, in which: (5) is a UV luminescent layer forming a UV luminescent regions (7); (8) are hermetically sealed, small compartment cells (capsules) containing retroreflective elements, and form a retroreflective region (6).

FIG. 2 is a schematic cross-sectional view of the retroreflective sheeting of FIG. 1, cut along A—A in FIG. 1. In FIG. 2, (1) is a light-transmitting cover layer, and (9) is a support layer in which glass beads (3) are embedded to about their lower hemispheres; (10) are the bonds connecting said light-transmitting cover layer (1) and support layer (9), the capsules (8) being formed upon disposition of these bonds. The lower hemispheres of the glass beads (3) are covered with a vapor-coated metal membrane (4) which serves as the photoreflective film and functions as the retroreflective elements which retroreflex light toward the direction of light source. The bonds (10) are formed as a UV luminescent layer (5) of a UV luminescent resin composition by a printing means such as screen printing and function as the UV luminescent region (7); and the glass beads (3)-embedded portion of the support layer which is not occupied by the bonds (10) is the retroreflective region.

Figure 3:
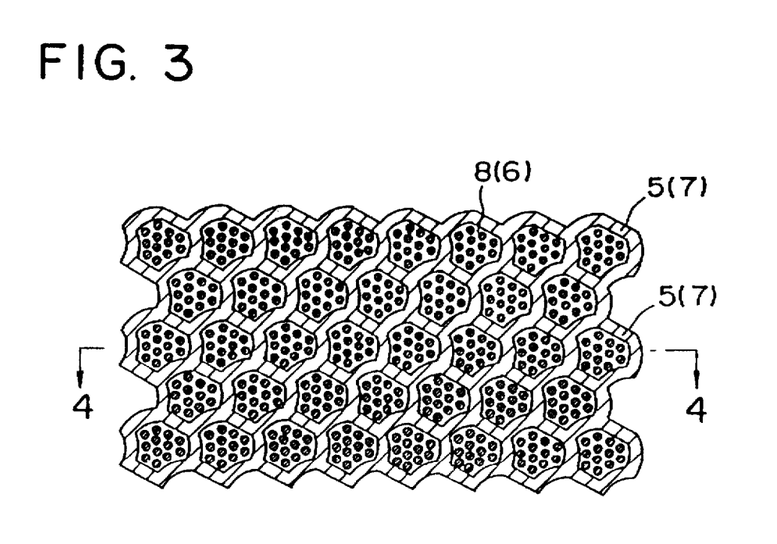
FIG. 3 is another example of a schematic plan view of a UV luminescent retroreflective sheeting of an embodiment of the present invention differing from that of FIG. 1, having encapsulated lens-structured retroreflective region, as seen from the incident side.

FIG. 3 is a schematic plan view of a UV luminescent retroreflective sheeting of the present invention having encapsulated lens-structured retroreflective region, showing an embodiment differing from that of FIG. 1, as seen from the incident side, in which: (5) is the UV luminescent layer forming UV luminescent regions (7); (8) are the capsules containing retroreflective elements, the main portion thereof forming the retroreflective region (6).

FIG. 4 is a schematic cross-sectional view of the retroreflective sheeting of FIG. 3, cut along B—B in FIG. 3. Similarly to FIG. 2, (1) is a light-transmitting cover layer and (9) is a support layer in which glass beads (3) are embedded to about their lower hemispheres; (10) are the bonds connecting said light-transmitting cover layer (1) and support layer (9), the capsules (8) being formed upon disposition of these bonds. It is same to the embodiment of FIG. 2 that the lower hemispheres of glass beads (3) are covered with vapor-coated metal membrane (4) and serve as the retroreflective elements and that the bonds (10) are formed of a UV luminescent resin composition. Whereas, in this embodiment a UV luminescent layer (5) made of a UV luminescent resin composition is formed locally on the support layer-facing surface of the light-transmitting cover layer (1), said bonds (10) and the UV luminescent layer (5) together form the UV luminescent region (7). The parts of the support layer at which these bonds (10) and UV luminescent layer (5) are not disposed and at which the glass beads (3) are embedded, function as the retroreflective region (6).

FIG. 5 is a schematic cross-sectional view illustrating an example of UV luminescent retroreflective sheeting of the present invention having a sealed lens-structured retroreflective region. In FIG. 5, (11) is a light-transmitting surface-protective layer, and (2A) is a light-transmitting support layer supporting glass beads (3); (2B) is a light-transmitting focusing layer for forming a vapor-coated metal membrane (4) serving as a photoreflective membrane, located at approximately the focus spot of the lenses, said support layer (2A) and focusing layer (2B) together forming a light-transmitting, sealing resin layer (2) for sealing glass beads therein. The glass beads and the vapor-coated metal membrane function as retroreflective elements which reflex the received light at the focussed spot of the lenses and retroreflex said light toward the light source. Underneath the light-transmitting surface-protective layer (11) a UV luminescent layer (5) is formed, which functions as the UV luminescent region (7), and the parts of the lens-embedding surface above which said UV luminescent layer (5) is not disposed function as the retroreflective region (6).

FIG. 6 shows an example of UV luminescent retroreflective sheeting of the present invention having encapsulated cube corner-structured retroreflective region. In FIG. 6, (1) is the light-transmitting cover layer, and (9) is the support layer, said cover layer being provided on its support layer (9)-facing surface with cube-corner type reflective elements in which each pair of confronting planes confront at an angle of about 90° are disposed and which function as the retroreflective elements to retroreflex light toward the direction of the light source; (10) are the parts connecting the light-transmitting cover layer (1) and the support layer (9), provision of which resulting in formation of capsules (8). Said connecting parts (10) are formed of a UV luminescent resin composition and function as the UV luminescent region (7). The retroreflective region (6) in this embodiment is the entire area of the light-transmitting cover layer excepting the parts at which the connecting parts (10) are adhered. By so providing UV luminescent regions (7) at the connecting parts (10), a UV luminescent retroreflective sheeting retaining the high retroreflectivity of the cube-corner type retroreflective sheeting is obtained.

FIG. 7 shows another example of UV luminescent retroreflective sheeting of the present invention having encapsulated cube corner-structured retroreflective region, which is an embodiment different from that of FIG. 6. Similar to the embodiment of FIG. 6, (1) is the light-transmitting cover layer and (9) is the support layer, said cover layer being provided on its support layer-facing surface with cube corner-type reflective elements; (10) are the parts connecting the light-transmitting cover layer (1) and the support layer (9), provision of which resulting in formation of capsules (8). Again similar to the embodiment of FIG. 6, said connecting parts (10) are made of a UV luminescent resin composition and function as the UV luminescent region (7). Whereas, in this embodiment UV luminescent layer (5) is formed on the incident side surface of the light-transmitting cover layer (1), to function also as the UV luminescent region (7). On the incident-side surface of the cover layer (1), a light-transmitting surface-protective layer (11) is formed. In this embodiment, therefore, the UV luminescent region consists of the connecting parts (10) and the UV luminescent layer (5) on the incident-side surface of the light-transmitting cover layer (1), and the retroreflective region (6) is the area of the light-transmitting cover layer (1) from which the parts bonded to the connecting parts (10) and the parts covered by the UV luminescent layer (5) which is formed on said cover layer are excluded.

In FIGS. 2, 4, 6 and 7, the bonds (10) are primarily non-reflective parts in the retroreflective sheeting and do not contribute to the product's retroreflective performance. It is convenient to provide a UV luminescent region (7) at said bonds (10), to improve visibility at night without adversely affecting the product's retroreflective performance. It is also a preferred embodiment to form the bonds (10), which are UV luminescent regions, by partial thermofusing and thermoforming of a support layer containing UV fluorescent agent, because the embodiment provides highly intimate adhesion between the support layer and the light-transmitting cover layer. In these modes of practice, furthermore, the light-transmitting cover layer and light-transmitting surface-protective layer are required to have the ability to transmit UV of the wavelengths necessary for UV luminescence, so that they do not obstruct UV luminescence of the UV luminescent regions (7) which are provided under said layers.

The UV luminescent retroreflective sheeting of the present invention exhibits superb function as a display device such as road signs or advertisement sign boards, as combined with a UV radiation means which irradiates UV in the direction of the retroreflective sheeting.

Figure 8:
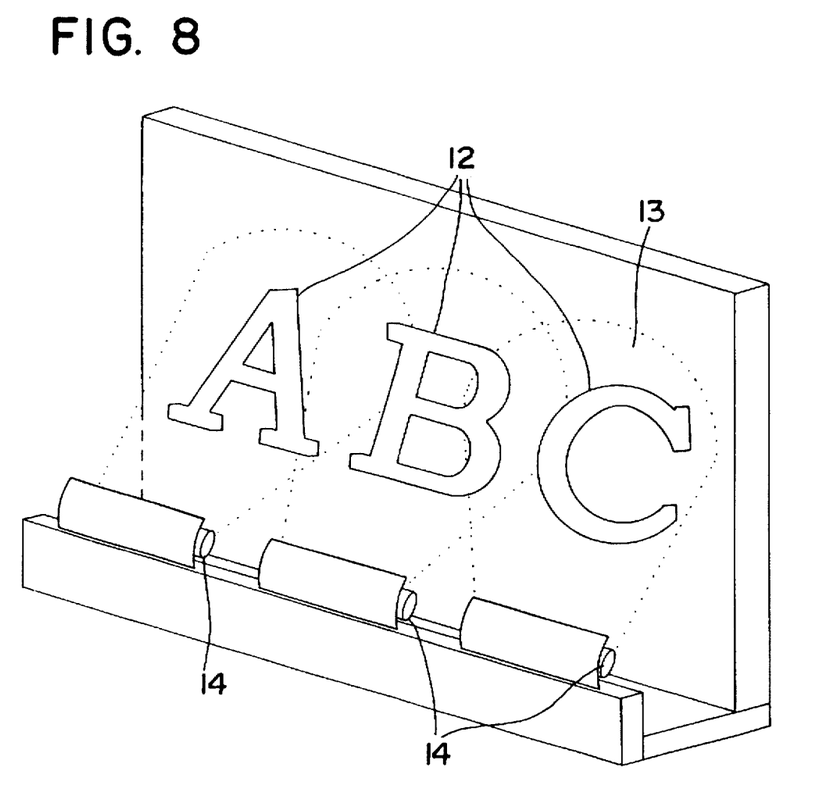
FIG. 8 shows a display device according to the present invention in which a UV luminescent retroreflective sheeting of the present invention is integrally combined with a UV luminescent lamp as a UV radiation means.

For example, as illustrated in FIG. 8, a display device according to the present invention, which is obtained by integrally combining a UV luminescent retroreflective sheeting of the present invention with a UV radiation means, such as a lamp which emits UV rays of the wavelengths in the range of, for example, 250–400 nm, preferably 300–400 nm, is an excellent display device exhibiting high visibility to persons located at various directions. In FIG. 8, (12) are the display part formed by suitably cutting a UV luminescent retroreflective sheeting into suitable characters, figures or signs, etc., (14) is a UV radiating lamp and (13) is the background of the display part (12), which may be an ordinary plate material such as a sheet steel painted in any desired color, or can be a retroreflective sheeting colored differently from the color of said display part or a UV luminescent retroreflective sheeting of the present invention emitting UV luminescence of different color tone. In the display device of the present invention, furthermore, it is not necessarily required to integrally assemble the UV luminescent retroreflective sheeting and a UV radiation means. For example, when the display part formed of the UV luminescent retroreflective sheeting of the display device is to be installed at a high place, a UV radiation means can be installed at a prescribed distance from the display part to radiate UV in the direction of the display part, whereby facilitating maintenance, e.g., replacement of the UV lamp which is the UV radiation means.

The display device of the present invention is capable of not only accurately expressing the intended characters, design, etc. but also readily providing a uniformly luminescent plane even over a wide area, differently from conventional internally lighted signboards or electric signboards, because the UV luminescent elements in the UV luminescent retroreflective sheeting used therein are very small in size and furthermore are regularly dispersed over the whole sheeting. Furthermore, by adequately selecting the kind of UV fluorescent agent used in the UV luminescent region, retroreflective sheeting emitting multi-colored lights can be formed, whereby providing instantaneously excellent visibility to the persons who are in the light source direction as well as in the directions other than that of the light source. Still in addition, because UV fluorescent agent used in the UV luminescent region scarcely develops color under natural light, different designs can be expressed on an identical display plane of single display device, under natural light and UV light, to diversify the informations to be provided by the device.

EXAMPLES

Hereafter the present invention is explained more specifically by means of working examples in which the retroreflectivity and UV luminance were measured as follows.

(1) Retroreflectivity

Using as the retroreflectivity-measuring instrument "Model 920" of Advanced Retro Technology Inc., amount (luminous energy) of retroreflective light from retroreflective region of 100 mm×100 mm size sample was measured following JIS Z-9117, at an observation angle of 12' and angle of incidence of 5', at optional five spots. The average of the measured values is recorded as the retroreflectivity.

(2) UV luminance

Using a UV luminescent device having four 10W UV-emitting fluorescent lamps incorporated therein and a visible light-cutting filter provided on its front surface, which emitted near-ultraviolet rays whose main wavelength was in the vicinity of 360 nm and wavelength range was 300–420 nm, each 100 mm×100 mm size sample was irradiated from directly overhead with the receiving light intensity at the surface of the UV luminescent region being controlled to be 0.8 mW/cm$^2$. At a distance of about 30 cm in said direction, luminance at about 5 mm$\phi$ spot on the UV luminescent region surface was measured at optional 5 locations with a luminance meter ["LS-100" Minoruta Camera K.K.]. The UV luminance A and B were determined as follows.

A: UV luminance of UV luminescent region (average of the five measured values) (cd/m$^2$)

B: Average UV luminance of UV luminescent retroreflective sheeting (cd/m$^2$)

=A×areal ratio of UV luminescent region (% ÷100

(3) Visibility evaluation

A directional signboard was prepared by providing, on a 2200 mm×2700 mm aluminum plate, cut characters from a UV luminescent retroreflective sheeting as the display part, using an encapsulated lens-type retroreflective sheeting ["Nikkalite ULS F806" (blue), Nikka Polymer K.K.] as the background. The signboard was installed high, at a distance from the ground to the lower edge of the signboard of about 4 m and in a posture that the sheet plane became approximately perpendicular. At a position distant from the spot directly below the horizontal center of the signboard by about 5 m, a floodlight-type 400 W high-pressure mercury vapor lamp was installed and adjusted to radiate UV over the entire surface of the signboard.

At positions distant from the spot directly below the signboard by about 100 m, twenty men and women monitors of 18–50 years old evaluated visibility of the signboard at night. The grading was conducted following the scale below, and the average value was made the result of the visibility evaluation:

5: very clearly visible
4: normally visible
3: characters are difficultly visible
2: vaguely visible (characters are hardly discernible)
1: invisible.

Example 1

A provisional support composed of an about 20 μm-thick polyethylene (PE) layer as laminated on paper was heated to about 105° C., on which glass beads of average particle size about 65 μm and a refractive index about 1.91 were dispersed uniformly and densely substantially as a monolayer. The glass beads were then embedded in PE to about ⅓ of their diameter by pressing with nip rolls.

Onto the surface of the provisional support on which the glass beads were exposed, aluminum was vacuum-deposited to form a vapor-coated metal membrane of about 0.1 μm in thickness covering approximately the hemispheres of the glass beads.

Then on a release-treated, 20 μm-thick polyethylene terephthalate (PET) process film, a mixed solution of 100 parts by weight of an acrylic resin solution [a 50 wt % solid solution of acrylic resin obtained through copolymerization of methyl methacrylate (MMA) 20 wt %, ethyl acrylate (EA) 65 wt % and 2-hydroxyethyl methacrylate (HEMA) 15 wt %, in methyl isobutyl ketone (MIBK)/toluene (1/1)] and 14.2 parts by weight of 75 wt % solid crosslinking agent derived from hexamethylene diisocyanate (HMDI) [1-methoxypropyl acetate-2/xylene (1/1) solution] was applied and dried to form an about 40 μm-thick reinforcing layer.

Further onto this reinforcing layer, a mixed solution obtained by mixing 100 parts by weight of an acrylic resin solution different from the above [a 50 wt % solid solution of acrylic resin obtained through copolymerization of MMA 40 wt %, EA 55 wt % and HEMA 5 wt % in MIBK/toluene (1/1)] and 30 parts by weight of titanium dioxide, and further mixing the resultant mixed solution with 10 parts by weight of an acrylic multistage polymerization type internal crosslinking resin solution [a 20 wt % solid solution in MIBK of MMA/butyl acrylate (BA)/styrene (ST) copolymer] and 13 parts by weight of a 15 wt % solid solution in MIBK of cellulose acetate butyrate (CAB) was applied and dried to form an about 80 μm-thick binder layer. Thus a reinforcing layer/binder layer laminated support layer was formed.

Next, on the metallized glass beads on the previously prepared provisional support, the support layer was superposed with its binder layer coming into contact with the glass beads, together heated and pressed so that the glass beads were embedded in the binder layer to about ⅓ of their diameter, followed by 14 days' aging at 35° C. to substantially complete crosslinking of the reinforcing layer. The provisional support was then torn off from the provisional support/support layer laminate, and onto the support layer on which the glass beads are exposed, a solution of UV luminescent resin composition composed of 100 parts by weight of an acrylic resin solution [about 50 wt % solid] ["Nissetsu KP-1538S" Nippon Carbide Industries, Inc.], 10 parts by weight of a chelate type crosslinking agent (about 6.5 wt % solid) ["Nissetsu CK-401", Nippon Carbide Industries, Inc.] and 92 parts by weight of green light-emitting inorganic fluorescent agent ["A-160", Nemoto Tokushu Kagaku K.K.] was printed with a pattern as illustrated in FIG. 1, using an 80-mesh silk screen, to form a UV luminescent layer (bonds) of about 100 μm in dry thickness.

On the resultant UV luminescent layer on the support layer, a 75 μm-thick acrylic film ["Acryprene", Mitsubishi Rayon K.K.] was mounted as the cover layer, which was pressed with a 80° C. heated roll, to provide an encapsulated lens-structured UV luminescent retroreflective sheeting.

In the resultant retroreflective sheeting, the UV luminescent region occupied about 62% and the retroreflective region, about 38%, to 100% of the incident-side surface area of said sheeting. The retroreflective sheeting was excellent in both retroreflectivity and luminance as well as visibility at the UV luminescent time as indicated in Table 1, and fully satisfied the purpose of the present invention.

Example 2

Example 1 was repeated except that the composition of the UV luminescent resin composition solution was changed to the one formed by blending, per 100 parts by weight of the acrylic resin solution, 8 parts by weight of the chelate type crosslinking agent and 100 parts by weight of the green light-emitting inorganic fluorescent agent; the screen-printed pattern was changed to a reticulated pattern of about 2 mm in line width as illustrated as 10 in FIG. 4; and further a dotted pattern UV fluorescent layer as indicated as 5 in FIG. 4 (dry thickness: about 50 μm) was printed on the surface of the cover layer using the UV luminescent resin composition solution of identical composition, with a 120 mesh silk screen, and the layers were superposed in the manner that the UV luminescent layer of the support layer faced the UV luminescent layer on the cover layer. Upon subsequently heating and press-adhering them in the manner similar to Example 1, an encapsulated lens-structured UV luminescent retroreflective sheeting was obtained.

In the resulting retroreflective sheeting the UV luminescent region occupied about 62% and the retroreflective region, about 38%, to 100% of the incident-side surface area of said sheeting. The retroreflective sheeting was excellent in both retroreflectivity and luminance as well as visibility at the UV luminescent time as indicated in Table 1, and fully satisfied the purpose of the present invention.

Example 3

On an about 75 μm-thick PET process film, a mixed solution composed of 100 parts by weight of an acrylic resin solution [a 43 wt % solid solution of EA/MMA copolymer in MIBK/toluene (1/1), "ST-100", Tokushu Shikiryo K.K.] and 15 parts by weight of a chelate-type crosslinking agent, "Nissetsu CK-401", was applied and dried to form an about 50 μm-thick cover layer.

On the so obtained cover layer, a solution of a UV luminescent resin composition composed of 100 parts by weight of an acrylic resin solution, "Nissetsu KP-1538S", 8 parts by weight of a chelate-type crosslinking agent, "Nissetsu CK-401", and 100 parts by weight of the same green light-emitting inorganic fluorescent agent to that which was used in Example 1, was printed with a 150-mesh silk screen in the manner that the area of the resultant UV luminescent layer should be about 55% to 100% of the cover layer area, to form a UV luminescent layer of about 30 μm in dry thickness.

Next, on the resultant UV luminescent layer of the cover layer, a mixed solution containing 100 parts by weight of an acrylic resin solution "ST-100" and 12 parts by weight of the same isocyanate crosslinking agent to that used in Example 1 was applied and dried to provide an about 30 μm-thick binder layer. On said binder layer glass beads of an average particle diameter about 68 μm and refractive index about 2.20 were uniformly and densely dispersed as a monolayer, which were pressed with nip rolls and embedded in the binder layer to about ½ of their diameter. A mixed solution of 100 parts by weight of the acrylic resin solution "ST-100" and 5 parts by weight of the chelate-type crosslinking agent was further applied thereon and dried, to provide an about 30 μm-thick focusing layer covering approximately the hemispheres of the glass beads which were exposed on the binder layer, along their curved surfaces. Subsequently aluminum was vacuum-deposited on the so formed focusing layer as an about 0.1 μm-thick vapor-coated metal membrane. Thereafter the process film was peeled off, and a sealed lens-type UV luminescent retroreflective sheeting was obtained.

In the so obtained retroreflective sheeting, the UV luminescent region occupied about 55% and the retroreflective region, about 45%, to 100% of the incident-side surface area of said sheeting. The retroreflective sheeting furthermore was excellent in both retroreflectivity and luminance as well as visibility at the UV luminescent time as indicated in Table 1, and fully satisfied the purpose of the present invention.

Example 4

Example 1 was repeated except that 92 parts by weight of the green light-emitting inorganic fluorescent agent was replaced by 95 parts by weight of a red light-emitting inorganic fluorescent agent ["A-120", Nemoto Tokushu Kagaku K.K.]. Thus an encapsulated lens-type UV luminescent retroreflective sheeting was obtained.

The resulting retroreflective sheeting was excellent in both retroreflectivity and luminance as well as visibility at the UV luminescent time, and fully satisfied the purpose of the present invention.

Example 5

Example 1 was repeated except that 92 parts by weight of the green light-emitting inorganic fluorescent agent was replaced by 92 parts by weight of a blue light-emitting inorganic fluorescent agent ["A-180", Nemoto Tokushu Kagaku K.K.]. Thus an encapsulated lens-type UV luminescent retroreflective sheeting was obtained.

The resulting retroreflective sheeting was excellent in both retroreflectivity and luminance as well as visibility at the UV luminescent time, and fully satisfied the purpose of the present invention.

Comparative Example 1

Example 1 was repeated except that 92 parts by weight of the green light-emitting inorganic fluorescent agent was replaced by 300 parts by weight of a light-storing pigment ["G-500", Nemoto Tokushu Kagaku K.K.]. Thus an encapsulated lens-type UV luminescent retroreflective sheeting was obtained.

The resulting retroreflective sheeting was short of satisfying the purpose of the present invention, in both luminance and visibility at the UV luminescent time, as indicated in Table 1.

TABLE 1

| | UV Luminescent Region (%) | Retroreflective Region (%) | Retroreflectivity (cd/lx · m²) | UV Luminance (cd/m²) | | Visibility Evaluation |
|---|---|---|---|---|---|---|
| | | | | A | B | |
| Example 1 | 62 | 38 | 205 | 282 | 175 | 5 |
| Example 2 | 62 | 38 | 203 | 282 | 175 | 5 |
| Example 3 | 55 | 45 | 85 | 281 | 155 | 5 |
| Example 4 | 62 | 38 | 210 | 82 | 51 | 5 |
| Example 5 | 62 | 38 | 208 | 40 | 25 | 4 |
| Comparative Example 1 | 62 | 38 | 208 | 0.134 | 0.083 | 2 |

Industrial Utilizability

The UV luminescent retroreflective sheeting of the present invention provides, by retroreflection of light, excellent visibility to persons who are in the direction of the light source at night and can concurrently provide by the UV luminescence excellent visibility to those who are in the directions other than that of the light source.

Thus, the UV luminescent retroreflective sheeting of the present invention can be widely utilized for markings such as road signs, construction signs, etc.; number plates on vehicles such as automobiles and motorcycles; safety goods such as safety cloths and survival equipment; and marking materials for signboards, vehicles, etc.

We claim:

1. Ultraviolet luminescent retroreflective sheeting comprising a retroreflective region having retroreflective elements and an ultraviolet luminescent region which emits light under ultraviolet radiation;

wherein the retroreflective region comprises an encapsulated lens retroreflective region comprising a support layer, a substantial monolayer of transparent microspheres partially embedded in one surface of the support layer, a light reflective layer coating on the portion of the transparent microspheres which are embedded in the one surface of the support layer, a transparent surface protective film facing in spaced relationship to the one surface of the support layer, and a series of bonding lines bonding the protective film to the one surface of the support layer to thereby form a plurality of sealed, small compartment cells, each of the sealed cells containing therein a part of the substantial monolayer of transparent microspheres, the non-embedded portions of which are exposed to the atmosphere within the sealed cell, or said retroreflective region comprises an encapsulated cube-corner retroreflective region comprising a support layer; a light-transmitting cover layer spaced apart from the support layer; a layer of cube-corner retroreflective elements disposed on one surface of the cover layer facing the support layer, a series of bonding lines bonding the surface layer to the layer of cube-corner retroreflective elements and forming a plurality of sealed, small compartment cells, each of the sealed cells containing therein cube-corner retroreflective elements which are exposed to the atmosphere within the sealed cell, and wherein the bonding lines comprise a fluorescent agent which emits light under ultraviolet radiation and a resin, wherein said bonding lines form at least a portion of the ultraviolet region, and, wherein when the ultraviolet luminescent region is illuminated with a fluorescent lamp which emits near-ultraviolet rays of main wavelength around 360 nm at a light-receiving intensity of 0.8 mW/cm², the luminance is at least 10 cd/m².

2. The ultraviolet luminescent retroreflective sheeting according to claim 1, wherein the fluorescent agent comprises inorganic fluorescent agent.

3. The ultraviolet luminescent retroreflective sheeting according to claim 2, wherein the inorganic fluorescent agent is at least one member selected from the group consisting of red light-emitting inorganic fluorescent agent, green light-emitting inorganic fluorescent agent and blue light-emitting inorganic fluorescent agent.

4. The ultraviolet luminescent retroreflective sheeting according to claim 2, wherein the inorganic fluorescent agent has a particle size distribution such that at least 80% by weight of the particles have a size not greater than 25 μm.

5. The ultraviolet luminescent retroreflective sheeting according to claim 1, wherein the fluorescent agent emits light under irradiation of ultraviolet rays having a wavelength within the range of 250–400 nm.

6. The ultraviolet luminescent retroreflective sheeting according to claim 1, wherein the ultraviolet luminescent region contains 10–600 parts by weight of said fluorescent agent, per 100 parts by weight of the resin component.

7. The ultraviolet luminescent retroreflective sheeting according to claim 1, wherein the resin component comprises at least one resin selected from the group consisting of acrylic resins, urethane resins, polyester resins, vinyl chloride resins and fluorine-containing resins.

8. The ultraviolet luminescent retroreflective sheeting according to claim 1, wherein the luminance of the ultraviolet luminescent region is at least 20 cd/m².

9. The ultraviolet luminescent retroreflective sheeting according to claim 3, wherein the inorganic fluorescent agent comprises at least one red light-emitting agent selected from the group consisting of $Y_2O_3$:Eu, $Y(P.V)O_4$:Eu, $Y_2O_2S$:Eu, $0.5MgF_2 \cdot 3.5MgO \cdot GeO_2$:Mn, $YVO_4$:Eu and $(Y,Gd)BO_3$:Eu.

10. The ultraviolet luminescent retroreflective sheeting according to claim 3, wherein the inorganic fluorescent agent comprises at least one green light-emitting agent selected from the group consisting of $Zn_2GeO_4$:Mn, ZnO:Zn, ZnS:Cu, ZnS:(Cu, Al), (Zn,Cd)S:(Cu,Al), ZnS:(Cu,Au,Al), $Zn_2SiO_4$:Mn, ZnS:(Cu,Ag), (Zn,Cd)S:Cu, $Gd_2O_2S$:Tb, $La_2O_2S$:Tb, $Y_2, SiO_5$: (Ce,Tb), $CeMgAl_{11}O_{19}$:Tb, ZnS: (Cu,Co), LaOBr: (Tb,Tm), $La_2O_2S$:Tb and $BaMg_2Al_{16}O_{27}$: (Eu,Mu).

11. The ultraviolet luminescent retroreflective sheeting according to claim 3, wherein the inorganic fluorescent agent comprises at least one blue light-emitting agent selected from the group consisting of $Sr_5(PO_4)_3Cl$:Eu, $BaMg_2Al_{16}O_{27}$:Eu, $BaMgAl_{10}O_{17}$:Eu, ZnS:Ag, $CaWO_4$, $Y_2SiO_5$:Ce, ZnS: (Ag,Ga,Cl), $Sr_2P_2O_7$:Eu, CaS:Bi and CaSrS:Bi.

12. The ultraviolet luminescent retroreflective sheeting according to claim 1, wherein said retroreflective region comprises said encapsulated lens retroreflective region.

13. The ultraviolet luminescent retroreflective sheeting according to claim 12, which further comprises an ultraviolet luminescent region on the support layer-facing surface of the light-transmitting cover layer or on the microspherical lens-embedding surface of the support layer.

14. The ultraviolet luminescent retroreflective sheeting according to claim 1, wherein said bonding lines are formed by printing.

15. The ultraviolet luminescent retroreflective sheeting according to claim 12, wherein, with respect to 100% of the incident side surface area of the sheeting, the areal ratio of the retroreflective region is within a range of 20–70%, the areal ratio of the ultraviolet luminescent region is within a range of 30–80%, and the sum of the areal ratios is 100%.

16. The ultraviolet luminescent retroreflective sheeting according to claim 1, wherein the retroreflective region comprises said encapsulated cube-corner retroreflective region.

17. The ultraviolet luminescent retroreflective sheeting according to claim 16, wherein, with respect to 100% of the incident side surface area of the sheeting, the areal ratio of the retroreflective region is within a range of 15–80%, the areal ratio of the ultraviolet luminescent region is within a range of 20–85%, and the sum of the areal ratios is 100%.

18. A display device comprising ultraviolet luminescent retroreflective sheeting according to claim 1, in combination with an ultraviolet radiation means for radiating ultraviolet rays in the direction of said sheeting.

19. The display device according to claim 18, wherein said ultraviolet luminescent retroreflective sheeting forms a display portion comprising one or more of characters, figures or signs.

20. The display device according to claim 19, which further comprises a background portion for said display portion, wherein the background portion comprises retroreflective sheeting having a color different from the color of the display portion.

21. The display device according to claim 19, which further comprises a background portion for said display portion, wherein the background portion comprises ultraviolet luminescent retroreflective sheeting having a different color tone from the color tone of the display portion.

22. The display device according to claim 19 wherein the sheeting and the ultraviolet radiation means are integrally combined.

23. The display device according to claim 20 wherein the sheeting and the ultraviolet means are installed at a distance one from the other.

24. Ultraviolet luminescent retroreflective sheeting comprising a retroreflective portion and an ultraviolet luminescent portion adjacent to but not substantially overlapping with the retroreflective portion, wherein said retroreflective portion comprises retroreflective elements encapsulated within sealed cells, said sealed cells being formed by a support layer and a light transparent cover layer and bond lines connecting the support layer to the transparent cover layer; and further wherein, said bond lines comprise particles of fluorescent agent which emits light when irradiated by ultraviolet radiation, said particles being dispersed in a resin component, whereby said bond lines form said adjacent but non-overlapping ultraviolet luminescent portion;

wherein when the ultraviolet luminescent region is illuminated with a fluorescent lamp which emits near-ultraviolet rays of main wavelength around 360 nm at a light-receiving intensity of 0.8 mW/cm², the luminance is at least 10 cd/m².

* * * * *